United States Patent
Sahlem

(10) Patent No.: US 7,549,666 B1
(45) Date of Patent: Jun. 23, 2009

(54) ARTICULATING HITCH FOR FIFTH WHEEL TRAILERS

(76) Inventor: Donald Peter Sahlem, 4635 N. Millgrove Rd., Akron, NY (US) 14001

( * ) Notice: Subject to any disclaimer, the term of this patent is extended or adjusted under 35 U.S.C. 154(b) by 518 days.

(21) Appl. No.: 11/493,049

(22) Filed: Jul. 26, 2006

Related U.S. Application Data

(60) Provisional application No. 60/703,207, filed on Jul. 28, 2005.

(51) Int. Cl.
 *B62D 53/06* (2006.01)
(52) U.S. Cl. ................................. 280/438.1; 280/455.1
(58) Field of Classification Search .............. 280/438.1, 280/455.1
 See application file for complete search history.

(56) References Cited

U.S. PATENT DOCUMENTS

| | | | | |
|---|---|---|---|---|
| 3,751,069 A | * | 8/1973 | Suckow | 280/406.2 |
| 4,582,337 A | * | 4/1986 | Hsueh | 280/455.1 |
| 4,722,542 A | * | 2/1988 | Hensley | 280/447 |
| 5,660,409 A | * | 8/1997 | Hensley | 280/455.1 |
| 6,247,720 B1 | | 6/2001 | Linger | |
| 6,308,977 B1 | | 10/2001 | Pulliam | |
| 6,386,570 B2 | | 5/2002 | Linger | |
| 6,877,757 B2 | * | 4/2005 | Hayworth | 280/438.1 |
| 7,364,180 B2 | * | 4/2008 | Hensley | 280/455.1 |
| 2001/0033068 A1 | * | 10/2001 | Melesko et al. | 280/455.1 |
| 2007/0052202 A1 | * | 3/2007 | Winckler | 280/438.1 |
| 2008/0217884 A1 | * | 9/2008 | Perri | 280/455.1 |

* cited by examiner

*Primary Examiner*—Paul N Dickson
*Assistant Examiner*—Tashiana Adams

(57) ABSTRACT

A device for automatically repositioning the pivot point between a fifth wheel trailer and truck. The hitch is composed of a base with integral first pivot member, two forward converging links, a second pivot member to which a spindle is attached. Pivotally attached to the spindle is a fifth wheel mount, which is pivotally attached to a fifth wheel. A pin adapter, which is attached to the hitch box of a fifth wheel trailer, eliminates rotation between the hitch box and fifth wheel assembly when hitched. This arrangement results in the trailer pivoting about the resulting center of rotation of the converging links, which is substantially forward of the pin of the trailer when in a straight-line orientation. The shifting of the pivot point distributes lateral forces from the trailer to all four wheels of the truck, thereby improving stability. During a turn, the subsequent articulation of the links results in a rearward repositioning of the pivot point, allowing sharp turns with a short bed truck.

5 Claims, 16 Drawing Sheets

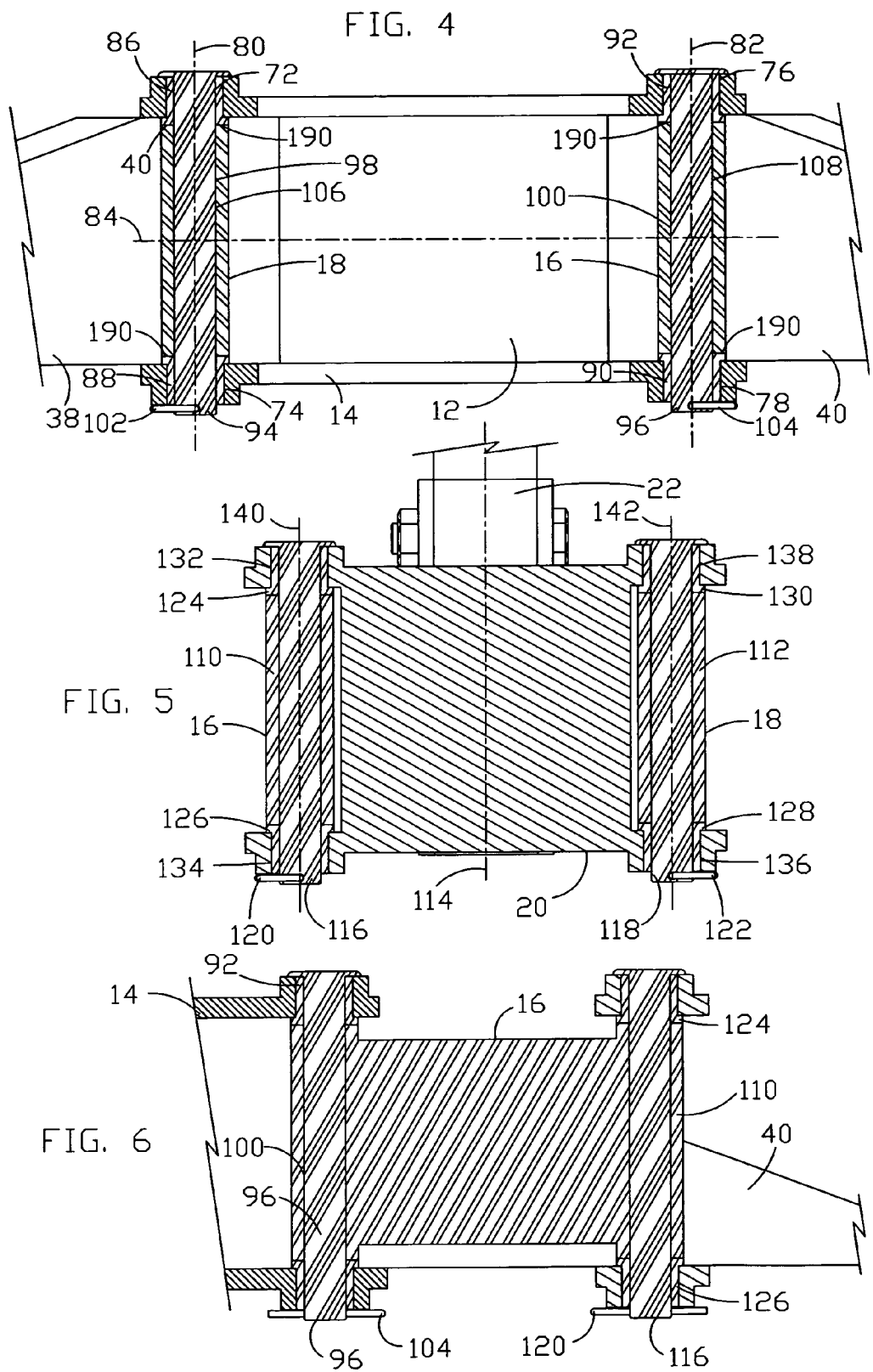

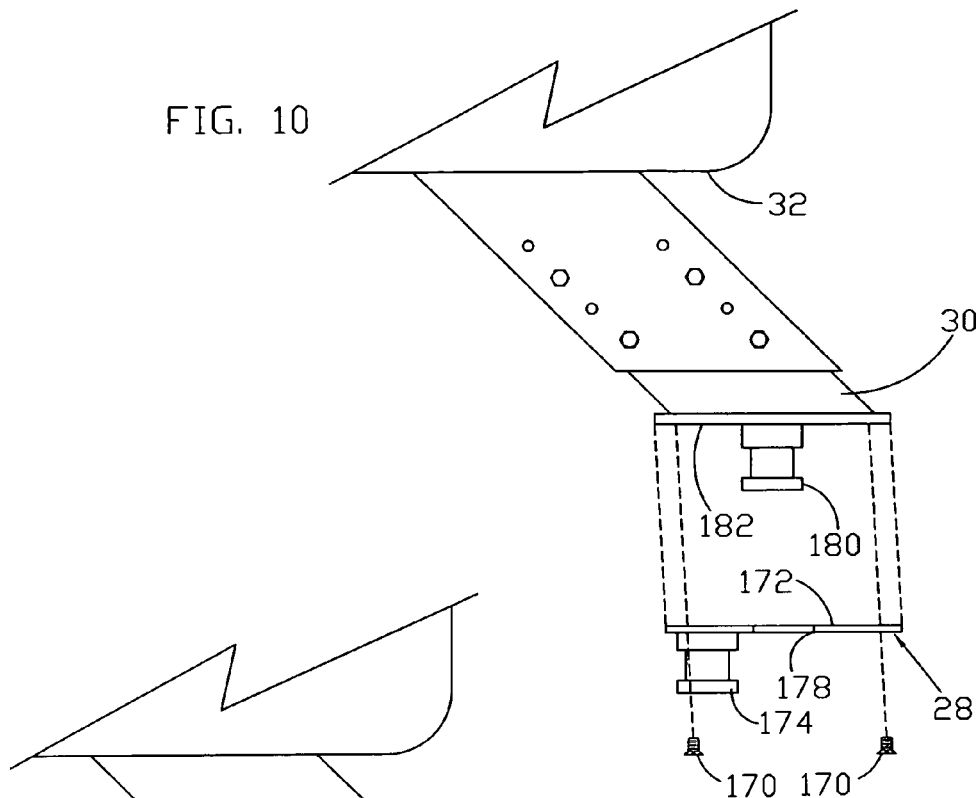
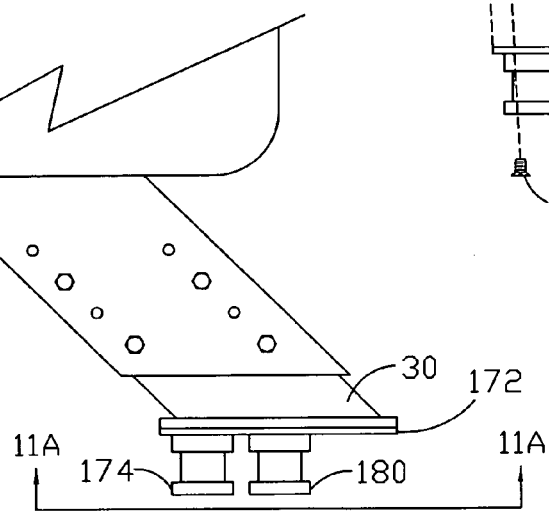
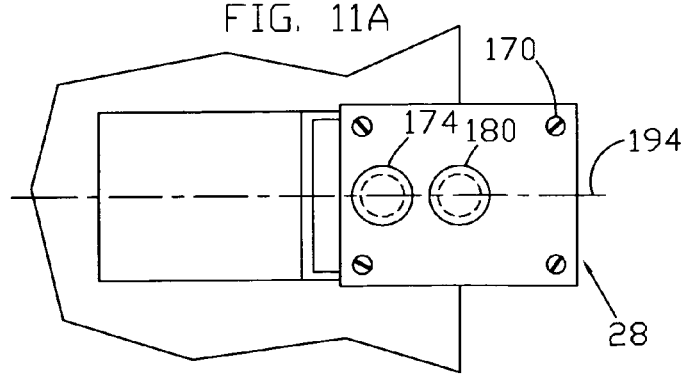

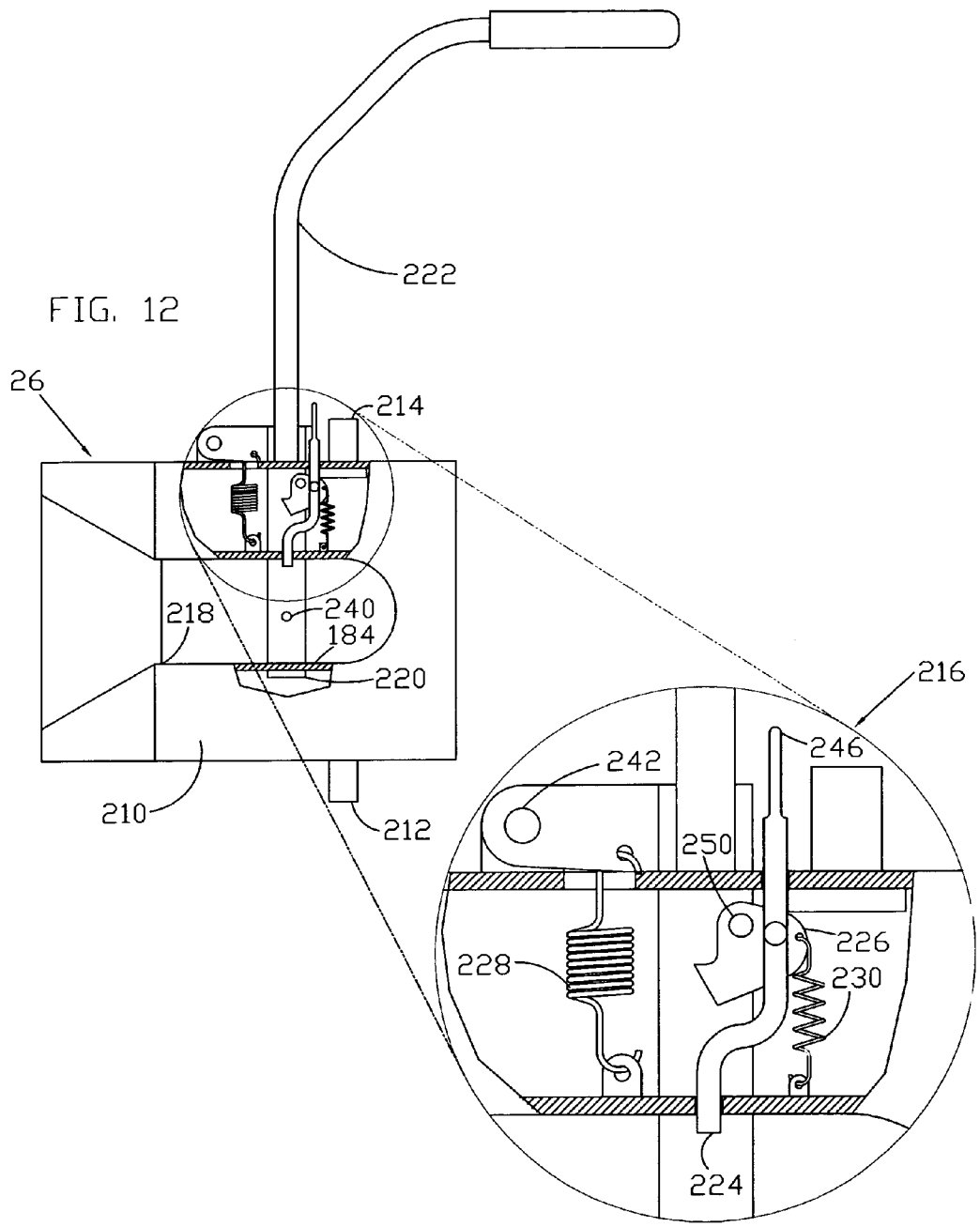

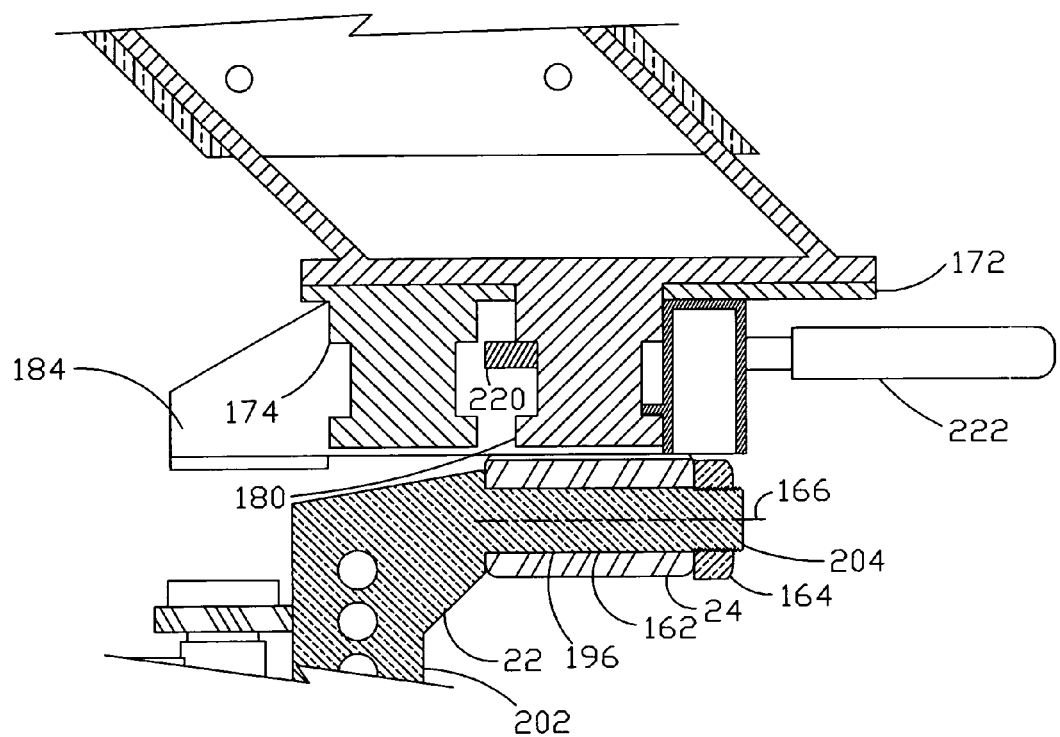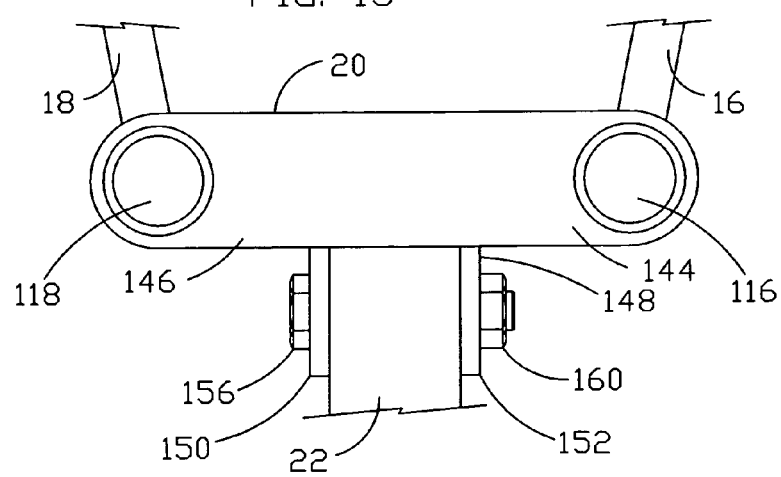

ARTICULATING HITCH FOR FIFTH WHEEL TRAILERS

CROSS REFERENCE TO RELATED APPLICATIONS

This application claims the benefit of United States Provisional Application No. 60/703,207 filed on Jul. 28, 2005

STATEMENT REGARDING FEDERALLY SPONSORED RESEARCH OR DEVELOPMENT

Not Applicable

REFERENCE TO SEQUENCE LISTING, A TABLE OR COMPUTER PROGRAM LISTING COMPACT DISK APPENDIX

Not Applicable

BACKGROUND

The present invention relates generally to automatically repositioning fifth wheel hitches for use with fifth wheel trailers and towing vehicles, and particularly to fifth wheel hitches that automatically reposition the pivot point of the hitch rearward as the towing vehicle turns relative to the trailer by utilizing a rotational pivotable mechanism with four links.

The background information discussed below is presented to better illustrate the novelty and usefulness of the present invention. This background information is not admitted prior art. The following discussions of related art are provided as illustrative and exemplary of problems now present in the art.

Fifth wheel trailers and tow vehicles for fifth wheel trailers are generally well known in the art. Fifth wheel trailers are usually much longer and heavier than tent campers and travel trailers. Thus a fifth wheel trailer typically requires a tow vehicle, such as a pickup truck. The front portion of a fifth wheel trailer generally extends over the rear portion of the tow vehicle so that a portion of the trailer's weight is carried directly over the rear axle of the tow vehicle. To accommodate the weight of the trailer a special hitch assembly is required. Trailers are fitted with a hitch box which includes a support plate and a downwardly extending hitch pin. Tow vehicles are fitted with a base plate having an aperture and a latch mechanism for mounting, and securing the trailer to the tow vehicle. In presently available hitch assemblies the support plate, which is where the mechanism's single pivot point is located, rotates relative to the base plate about the hitch pin. Typically, the hitch assembly, and thus, the single vertical pivot axis, is mounted directly over or a short distance in front of the rear axle of the tow vehicle in order to maintain proper weight distribution.

To prevent contact between a trailer and a cab while maneuvering in tight spaces, the clearance between the pivot point and the rear of the cab must be at least half the width of the trailer. Trailers come in a variety of widths and lengths from long tractor trailers to short mini-trailers. Recreational trailers, for example, are often as much as 102 inches wide, but more typically are 96 inches and can be less. Such a recreational vehicle if routinely towed by a short bed pickup truck. Most short bed pickups have a bed that is typically only about 6 feet long. Beds that are 8 feet long are available on regular and extended cabs, as are short beds. Although the shorter bed pickups have the towing capacity to handle fifth wheel trailers, they do not have enough clearance between the axle and the rear of the cab to allow the trailer to pivot a 90 degree angle without the trailer coming into contact with the cab and potentially causing damage to the truck and injury to occupants. Generally, a fifth wheel trailer contacts the cab of a short bed pickup at angles much less than 90 degrees.

A number of attempts have been made to adapt fifth wheel trailers for towing by such short bed trucks, but each of these has been shown to have a significant drawback. One attempt uses a hydraulically operated sliding base to move the hitch assembly, and hence the pivot point, rearward from the cab. This assembly is likely to be expensive, difficult to maintain, and has to be driver actuated, which means the vehicle with trailer must be at rest at some safe spot off of the road. Actuating the working mechanism of this assembly requires a delay or lag time, which would mean that during an accident, such as a jackknife, the system would operate too slowly to prevent the trailer from contacting and most likely damaging the cab.

Another approach, employs a sliding base to move the pivot point from a front position to a rear position and requires the operator to exit the truck to manually release the locking mechanism, lock the brakes on the trailer, and then reenter the truck to drive it forward until the desired rearward position of the pivot point is reached before the trailer is able to pivot, relative to the truck, without making an undesirable contact with the cab. When preparing to drive the truck/trailer combination at highway speeds, the process is reversed to move the hitch to the forward position. While this method solves the clearance problem, it requires the operator to anticipate when sharp turns were going to be made in order to move the hitch before the fact. This system also could create a hazard if tight turns were required in a traffic situation and thus would be practically useless in an emergency.

Yet still another attempt, offers a sliding hitch assembly that automatically moves rearward away from the truck cab in response to pivotal movement of the trailer and the truck that typically occurs during normal driving. The sliding hitch assembly includes a sliding base plate, mounted on a pair or rods. An additional plate is attached to the hitch box of the trailer, with a key that prevents rotation between the hitch box and base plate. A lever arm extends from the base plate, and a cam follower attached to the end of the lever arm engages a stationary slot that extends substantially perpendicular to the rods. As the truck turns relative to the trailer, the rotation of the base plate causes the cam follower to move within the slot towards one of the slot ends, which in turn causes the base plate to slide back and forth along the rods. As the base plate is rotated the base plate moves between a forward position, in which the cam follower is at the center of the slot, and a rearward position, in which the cam follower is near one of the slot ends. When in the forward position, the hitch pin receiving aperture, and thus the pivot point of the trailer, is directly or slightly in front of the axle centerline. As the base plate rotates relative to the truck, the lever arm mechanism causes the base plate to slide rearwardly on the rods, moving the pivot point of the trailer away from the rear of the truck cab. The numerous components of this single pivot point device tend to make this device more prone to breakage, more costly to repair, and cause the device to be relatively expensive.

It is clear then that, there still exists a need for a hitch assembly that allows fifth wheel trailers to be towed without the fear of contact between the trailer and the truck where the hitch assembly provides for automatic repositioning of the effective pivot point in response to pivoting movement between the trailer and the towing vehicle and that does not require the expense, maintenance, and lag time of hydraulic systems, and that does not require the operator to exit the vehicle in order to lock or unlock the hitch assembly.

SUMMARY

The present invention, addressing all of the problems described above, teaches a rotating hitch assembly that enables fifth wheel trailers to be towed without fear that the trailer and truck will come in contact. Moreover, the rotating hitch assembly according to the principles of the invention provides for automatic forward and rearward rotational positioning and repositioning of the "effective pivot point" of a combined towing vehicle and fifth wheel trailer, thus providing for the towing vehicle and attached trailer to make sharp turns without the fear of undesirable contact between the towing vehicle and the trailer. The effective pivot point is the result of the motions of four interconnected dependent pivot points, which are brought about in response to pivoting motions between the trailer and the towing vehicle. Furthermore, the hitch according to the principle of the present invention does not require the expense, maintenance, and lag time of hydraulic systems, nor does it require the operator to exit the vehicle in order to lock or unlock the hitch assembly. While the automatic pivotal repositioning of the effective pivot point rearward facilitates sharp turns, the automatic pivotal forward shifting of the effective pivot point when the truck and trailer are in a straight orientation provides the new advantage of distributing lateral forces that are generated by the trailer between the front and rear axles of the truck, thus, improving stability. The invention provides for the rearward shifting of the effective pivot point upon turning and new forward shifting of the pivot point when the unit is traveling in a straight line, and does so using fewer components than the prior art.

BRIEF DESCRIPTION OF THE DRAWINGS

In order that these and other objects, features, and advantages of the present invention may be more fully comprehended and appreciated, the invention will now be described, by way of example only, with reference to specific embodiments which are illustrated in appended figures wherein like reference characters indicate like parts throughout the several figures. It should be understood that these figures only depict a few preferred embodiments of the present invention and are not therefore to be considered limiting in scope. Thus, the invention will be described and explained with added specificity and detail through the use of the accompanying figures, in which:

FIG. 4 is a sectional view of first pivot member and associated links, pins and bearings.

FIG. 5 is a sectional view of the second pivot member and associated links, pins and bearings.

FIG. 6 is a sectional view of a connecting link and associated pivot members, pins and bearings.

FIG. 10 is an exploded side view of the fifth wheel hitch box and fifth wheel pin adapter.

FIG. 11 shows an assembled side view of the fifth wheel hitch box and fifth wheel pin adapter.

FIG. 11a illustrates a view looking up at the pin adapter plate attached to the fifth wheel hitch box.

FIG. 12 is a top sectional view of the fifth wheel assembly, with the latch assembly closed.

FIG. 14 is a sectional view of the fifth wheel assembly, fifth wheel pin adapter and fifth wheel hitch box.

FIG. 15 is a top plan view of the second pivot member and related components.

A LIST OF REFERENCE NUMBERS AND RELATED PARTS OF THE INVENTION

Figure 1:
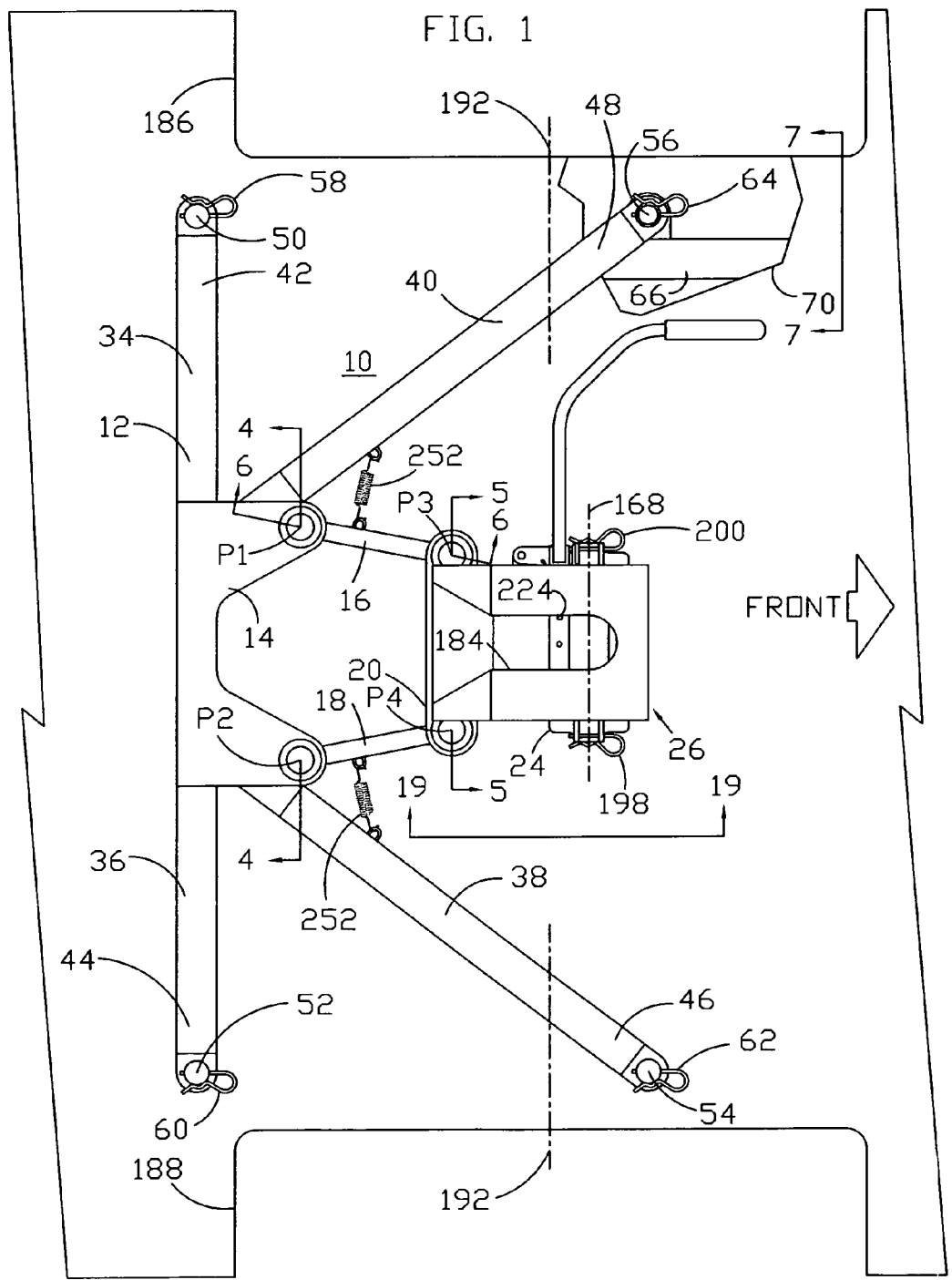
FIG. 1 is a top plan view of the fifth wheel hitch according to the principles of the present invention, shown installed in a truck bed (trailer omitted for clarity).

10 Fifth wheel hitch member that is affixed to a towing vehicle, also referred to as a first hitch member.
$P_1$ and $P_2$ denote the two pivoting points of first element 14 of base 12.
$P_3$ and $P_4$ denote the two pivoting points of second element 20 of base 12.
12 Base of hitch 10
14 First element of base 12 having two pivoting points.
16 Connecting link
18 Connecting link
20 Second element of base 12 having a second set of pivoting points.
22 Mounting spindle
24 Fifth wheel mount
26 Fifth wheel assembly
28 Pin adapter 30 Hitch box
32 Fifth wheel trailer
34 First leg member of base 12
36 Second leg member of base 12
38 Third leg member of base 12
40 Fourth leg member of base 12
42 Distal end of leg 34
44 Distal end of leg 36
46 Distal end of leg 38
48 Distal end of leg 40
50 Mounting pin for leg 34
52 Mounting pin for leg 36
54 Mounting pin for leg 38
56 Mounting pin for leg 40
58 Hitch pin for mounting pin 50
60 Hitch pin for mounting pin 52
62 Hitch pin for mounting pin 54
64 Hitch pin for mounting pin 56
66 Frame of truck
68 Aperture in truck bed
70 Truck bed
72 Bearing bore in first element 14
74 Bearing bore in first element 14
76 Bearing bore in first element 14
78 Bearing bore in first element 14
80 Centerline of bearing bores 72 and 74
82 Centerline of bearing bores 76 and 78
84 Horizontal centerline of base 12
86 Pivot member bearing for bearing bore 72
88 Pivot member bearing for bearing bore 74
90 Pivot member bearing for bearing bore 78
92 Pivot member bearing for bearing bore 76
94 Pivot pin for bearings 86 and 88
96 Pivot pin for bearings 90 and 92
98 Rearward bore of connecting link 18
100 Rearward bore of connecting link 16
102 Hitch pin for pivot pin 94
104 Hitch pin for pivot pin 96
106 Rear bore of connecting link 18
108 Rear bore of connecting link 16
110 Front bore of link connecting link 16
112 Front bore of link connecting link 18
114 Vertical centerline of second element 20
116 Pivot pin for bearings 124 and 126
118 Pivot pin for bearings 128 and 130
120 Hitch pin for pivot pin 116
122 Hitch pin for pivot pin 118
124 Bearing in bore 132
126 Bearing in bore 134
128 Bearing in bore 136
130 Bearing in bore 138
132 Bearing bore in second element 20
134 Bearing bore in second element 20
136 Bearing bore in second element 20
138 Bearing bore in second element 20
140 Centerline of bearings 124 and 126
142 Centerline of bearings 128 and 130
144 Left side of second element 20
146 Right side of second element 20
148 Front portion of second element 20
150 Vertical flange of second element 20
152 Vertical flange of second element 20
154 Apertures in flanges 150 and 152
156 Bolt for flanges 150 and 152
158 Bolt for flanges 150 and 152
160 Nuts for bolts 156 and 158
162 Pivotal mounting surface of spindle 22
164 Nut for spindle 22
166 Centerline of spindle 22
168 Centerline of fifth wheel assembly 26
170 Machine screws for attaching pin adapter 28
172 Base plate for pin adapter 28
174 Rearward pin of pin adapter 28
178 Aperture in base plate 172
180 Hitch box pin of trailer 32
182 Bottom surface of hitch box 30
184 Slotted portion of fifth wheel assembly 26
186 Wheel well of truck 234
188 Wheel well of truck 234
190 Shoulder of bearings 86, 88, 90 and 92
192 Centerline of rear axle of truck 234
194 Longitudinal centerline of trailer 32
196 Center bore of fifth wheel mount 24
198 Hitch pin for fifth wheel assembly 26
200 Hitch pin for fifth wheel assembly 26
202 Mounting portion of spindle 22
204 Spindle portion of mounting spindle 22
206 Mounting yoke for fifth wheel mount 24
208 Mounting yoke for fifth wheel mount 24
210 Flat surface of fifth wheel assembly 26
212 Mounting bar for fifth wheel assembly 26
214 Mounting bar for fifth wheel assembly 26
216 Latch mechanism for fifth wheel assembly 26
218 Rear open portion of fifth wheel assembly 26
220 Latch bar of mechanism 216
222 Handle of mechanism 216
224 Trigger bar of mechanism 216
226 Retaining plate of mechanism 216
228 Latch bar spring of mechanism 216
230 Trigger bar spring of mechanism 216
232 Centerline of the truck 234.
234 Truck
236 Intersection of centerline of trailer 194 and centerline of truck 232
238 Line delineated by pivot bores 72 and 76
240 Retaining pin of mechanism 216
242 Aperture in latch plate 220
244 Aperture in fifth wheel assembly 26
246 Finger aperture in trigger 224
248 Truck cab
250 Pivot pin for retaining plate 226
252 Centering springs for first hitch member 10
254 Alternate fifth wheel assembly
256 Widened pin slot in alternate assembly 254
258 Clamping screw of alternate assembly 254
260 Left clamp jaw of alternate assembly 254
262 Right clamp jaw of alternate assembly 254
264 Crank of alternate assembly 254
266 Threaded portion of clamping screw 258
268 Threaded portion of clamping screw 258
270 Pin slot in alternate assembly 254
272 Latch bar of alternate assembly 254
274 Sleeve bearing for clamping screw 258
276 Sleeve bearing for clamping screw 258
278 Flange in alternate assembly 254 for sleeve bearing 274
280 Flange in alternate assembly 254 for sleeve bearing 276

It should be understood that the figures are not necessarily to scale. In certain instances, details which are not necessary for an understanding of the present invention, or which render other details difficult to perceive, may have been omitted.

DEFINITIONS

Fifth wheel hitch, as used herein, refers to the combined elements attached to a towing vehicle, such as a short bed pickup truck, and a fifth wheel trailer allowing for coupling of and rotational movement between the towing vehicle and fifth wheel trailer.

Centerline of fifth wheel assembly, as used herein, refers to the line about which the fifth wheel assembly rotates fore and aft relative to the fifth wheel mount.

Centerline of rear axle of truck, as used herein, refers to the line about which the rear wheels of the truck rotate.

Centerline of spindle, as used herein, refers to the line about which the fifth wheel mount rotates side to side relative to the spindle portion of mounting spindle.

Centerline of the truck, as used herein, refers to the longitudinal line midway between the right and left sides of the truck at road level.

Longitudinal centerline of trailer, as used herein, refers to the longitudinal line midway between the right and left sides of the trailer at road level.

DETAILED DESCRIPTION

This invention relates to a "fifth wheel" hitch for use with a fifth wheel trailer and a towing vehicle. To use a fifth wheel hitch there is a hitch part on the trailer that is receivable by a hitch part on the towing vehicle. The fifth wheel hitch of the present invention provides for a trailer/towing vehicle to be able to make tight turns, such as those that are required when parking, backing up, and turning a corner on a narrow roadway without the fear of unwanted contact between trailer and truck. Additionally, the fifth wheel hitch of the present invention provides for improved road stability of the truck/trailer combination. Furthermore the fifth wheel hitch as taught herein provides for automatically repositioning of the turning pivot point of the combination trailer/truck.

Figure 2:
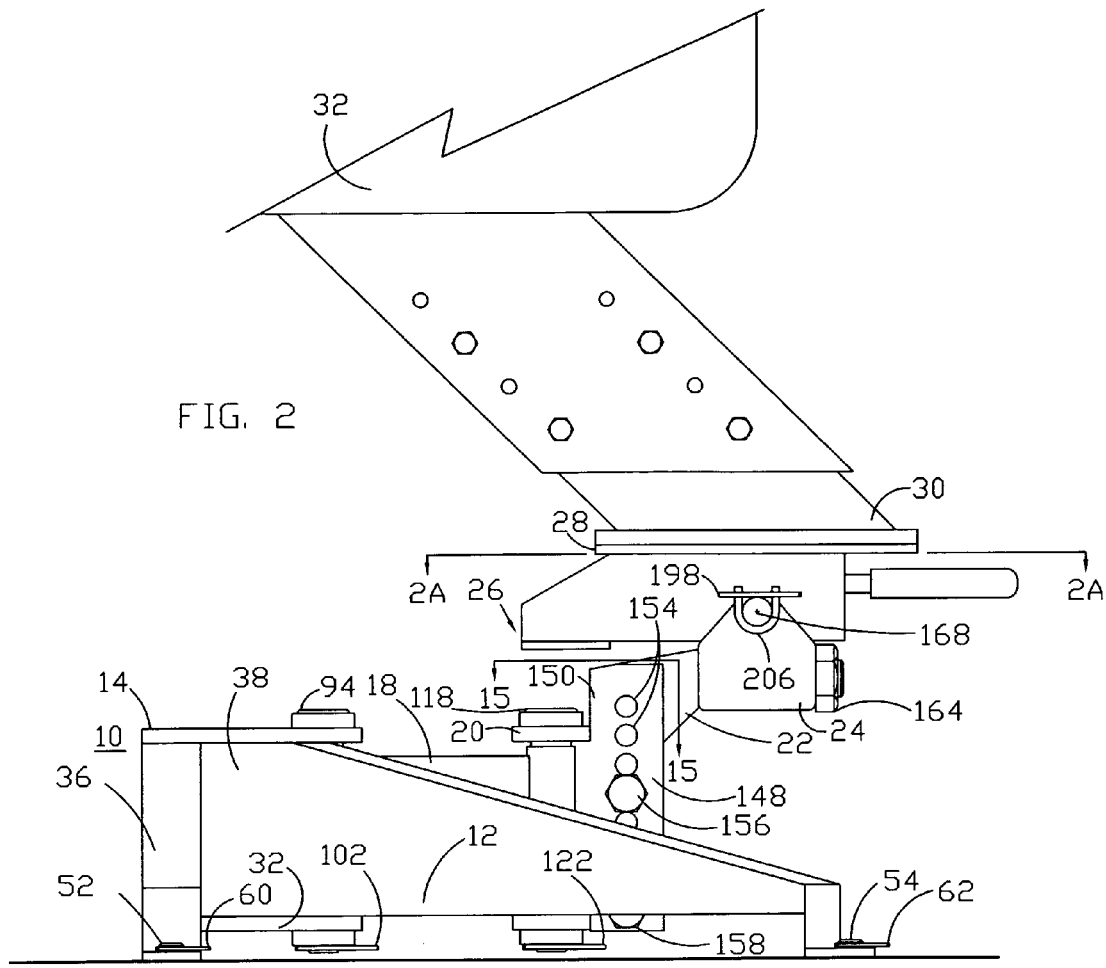
FIG. 2 is a side plan view of the fifth wheel hitch, as illustrated in FIG. 1, with trailer hitched.
Figure 3:
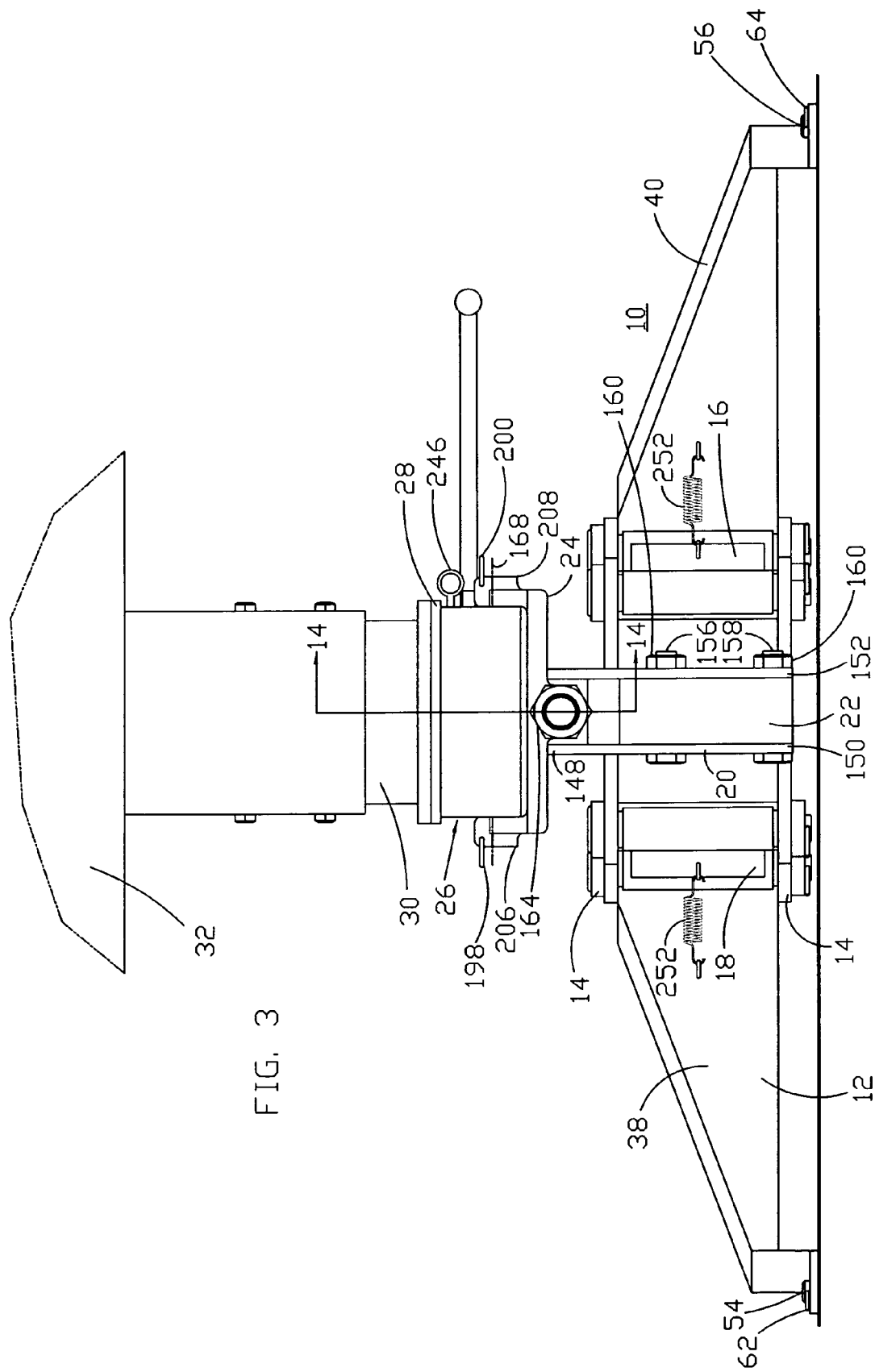
FIG. 3 is a front plan view of the fifth wheel hitch, shown installed in a truck bed, with trailer hitched.

In a preferred embodiment, as illustrated in FIGS. 1-3, fifth wheel hitch member 10, also referred to as first hitch member, is affixed to the towing vehicle. First hitch member 10 has four independent but related pivot points P1, P2, P3 and P4, the combined pivoting action of which defines the "effective pivot point" between the trailer and the truck. First hitch member 10 comprises base 12 which supports and is integral to first element 14 having two pivoting points $P_1$ and $P_2$ and second element 20 of base 12 having two pivoting points $P_3$ and $P_4$. One end of first member 14 is pivotally attached to a first end of connecting link 16 and an opposing end of first member 14 is pivotally attached to a first end of connecting link 18. A second end of connecting link 16 is pivotally attached to one end of second element 20 and a second end of connecting link 18 is connected to an opposing end of second element 20. Also attached to second element 20 is mounting spindle 22 which is attached to fifth wheel mount 24 which is attached to fifth wheel assembly 26 (see FIGS. 1 and 2).

Figure 7:
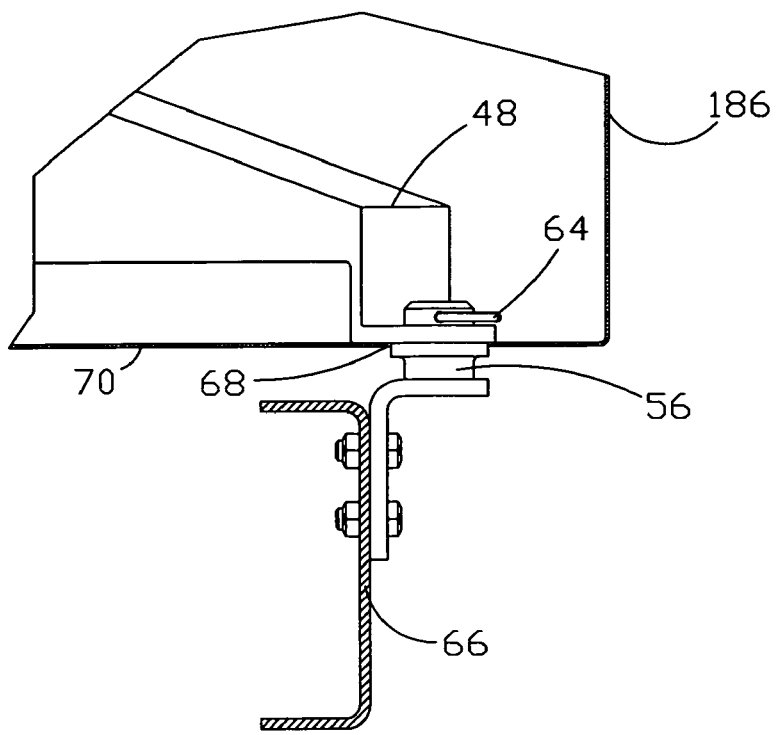
FIG. 7 is a sectional view of the mounting hardware for the fifth wheel hitch.

Additionally, base 12 provides mounting means for securely mounting hitch 10 to bed 70 of truck 234 between wheel wells 186 and 188 (see FIG. 1) where centerline 168 of fifth wheel assembly 26 is slightly forward of centerline 192, of the rear axle of the truck. The mounting means assembly of base 12 comprises four mounting leg assemblies: first leg member 34 with mounting pin 50 secured with hitch pin 58 at distal end 42, second leg member 36 with mounting pin 52 secured with hitch pin 60 at distal end 44, third leg member 38 with mounting pin 54 secured with hitch pin 62 at distal end 46, and fourth leg member 40 with mounting pin 56 secured with hitch pin 64 at distal end 48. Rigid attachment of mounting pins 50, 52, 54 and 56 to truck frame 66 is illustrated in FIG. 7, where mounting pin 56 can be seen extending through aperture 68 of truck bed 70 to be securely attached to truck frame 66. It is to be understood that a variety of readily available mounting methods well known in the art or to be known, may be substituted for the method illustrated in FIG. 7 without departing from the principles of the present invention. As illustrated in FIGS. 1-3, are proximate ends of legs 34, 36, 38, and 40 rigidly attached to first element 14. As illustrated in FIGS. 1 and 4, first element 14 is of a generally symmetrical V-shape with vertically oriented pairs of bearing bores 72, 74 and 76, 78 at opposing corners. Bearing bores 72 and 74 are coaxial, as are bearing bores 76 and 78. Centerlines 80 and 82 of bearing bore pairs 72, 74 and 76, 78 are parallel to each other and are perpendicular to horizontal centerline 84 of base 12. FIG. 4 also shows first member bearings 86-88 and 92-90 inserted in the bearing bores with shoulders 190 of the bearings facing toward horizontal centerline 84 of first element 14. Left pivot pins 94 and right pivot pin 96 are inserted into respective left and right pairs of bearings 86-88 and 92-90, respectively, through rearward bores 98 and 100 of connecting links 18 and 16 (FIGS. 1 and 2), which are pivotally connected to first element 14. Left and right pivot pins 94 and 96 are secured by hitch pins 102 and 104, respectively. Connecting links 18 and 16 each have bores on a first end for accepting pivot pins 94 and 96. Links 16 and 18 are equal in length and the distance between rear bore 100 and front bore 110 (see FIG. 6) is slightly longer than one half the distance between bores 72 and 76 of first element 14.

Figure 17:
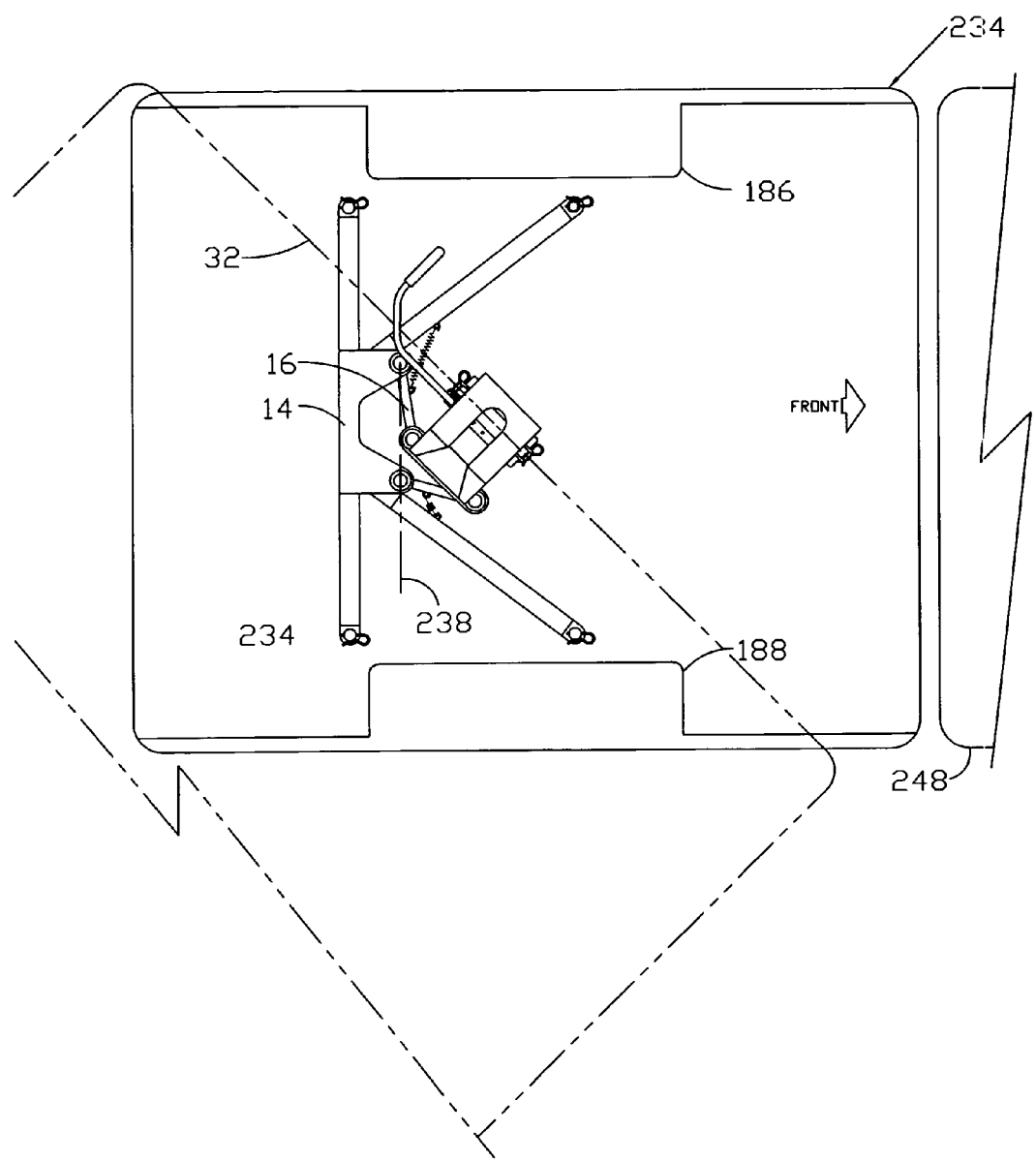
FIG. 17 is a top plan view of the fifth wheel hitch, shown in a partial turn of the truck and trailer (trailer shown in phantom).
Figure 18:
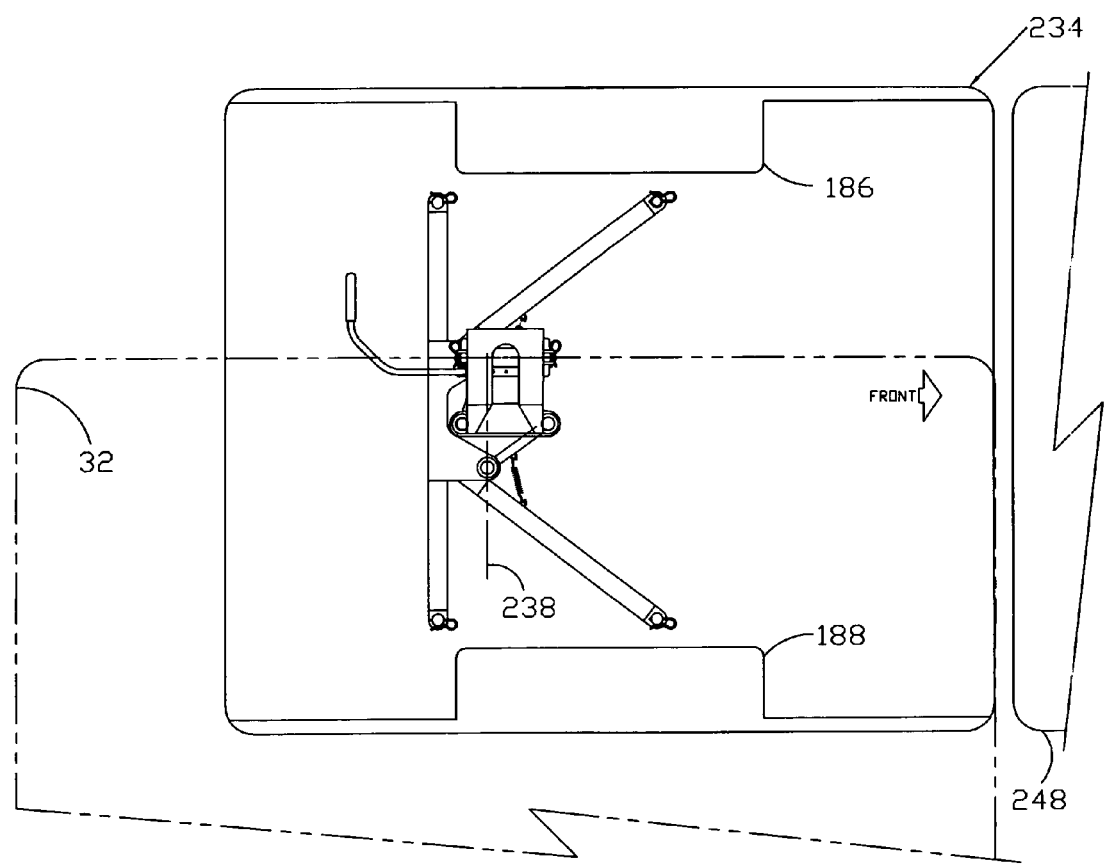
FIG. 18 is a top plan view of the fifth wheel hitch, shown in a full turn of the truck and trailer (trailer shown in phantom).

Pin adapter 28 illustrated in FIGS. 2 and 8-11, attaches to hitch box 30 of the second hitch member that is fixedly attached to fifth wheel trailer 32. During turns (see FIGS. 16-18), the hitch connection created by these components automatically repositions the pivot point of the hitched trailer rearward, resulting in the necessary clearance between truck cab 248 and trailer 32 that is required for making tight turns without damaging contact between the truck cab and trailer. An additional benefit is that when the truck-trailer is going straight, first element 14, second element 20, and converging links 16 and 18 place the effective pivot point forward, thereby distributing any lateral forces generated by the towed trailer, between the front and rear wheels of the truck, enhancing stability.

FIG. 5, a sectional view, illustrates second element 20 which is symmetrical about its vertical centerline 114. The frontward ends of connecting left and right links 16 and 18 are connected to respective left and right front ends 144 and 146 (see FIG. 15) of T-shaped element 20, using left and right pivot pins 116 and 118, secured by hitch pins 120 and 122. The pivot pins are inserted through respective bearings 124, 126, 128, and 130 and received in bearing bores 132, 134, 136, and 138 of second element 20. Left bearing bores 132 and 134, of second element 20, are coaxial as are right bearing bores 136 and 138. The centerlines 140 and 142 of the bearing bores are parallel to each other and are equally spaced on opposite sides of vertical centerline 114 of second element 20. The distance between bores 132 and 138 of second element 20 is slightly shorter than the distance between the bores 72 and 76 of first element 14.

The vertical distance between the upper and lower pivot bores of first and second elements 14 and 20 along with the vertical height of connecting links 16 and 18 form four parallel couple joints for carrying the pin weight of the hitched trailer. FIGS. 3 and 15 show front portion 148 of second element 20 consisting of two vertically oriented flanges 150 and 152. FIG. 2 illustrates series of apertures 154 for fastening mounting spindle 22 via bolts 156 and 158. Bolts 156 and 158 are secured with nuts 160. FIG. 14 illustrates mounting spindle 22 consisting of mounting portion 202 sized to fit between vertically oriented flanges 150 and 152 of second element 20 (as illustrated in FIG. 15) and apertures 154 for accepting bolts 156 and 158 bolting mounting spindle 22 to second member 20. In addition, mounting spindle 22 consists of spindle portion 204, which provides pivotal mounting surface 162 (FIG. 14) for fifth wheel mount 24, which is held in place by nut 164. As illustrated in FIGS. 2, 3 and 14, fifth wheel mount 24 is essentially flat with centrally located bore 196 (see FIG. 14), for pivotal attachment to spindle 204, and two mounting yokes 206 and 208 (see 208 in FIG. 3) located at the ends for pivotally mounting fifth wheel assembly 26 (see FIG. 2). Fifth wheel assembly 26 includes flat surface 210 (FIG. 12), two mounting bars 212 and 214, latch mechanism 216, and slotted portion 184, which is open on rear portion 218, allowing hitching of trailer 32. Fifth wheel assembly 26 is held in place by two hitch pins 198 and 200 (see FIG. 1). As illustrated in FIGS. 1 and 14, pivots at centerlines 166 and 168 allow for fore and aft as well as side to side pivoting between truck 234 and trailer 32. Latch mechanism 216 consists of latch bar 220, handle 222, trigger bar 224, retaining plate 226, latch bar spring 228 and trigger bar spring 230.

Figure 2A:
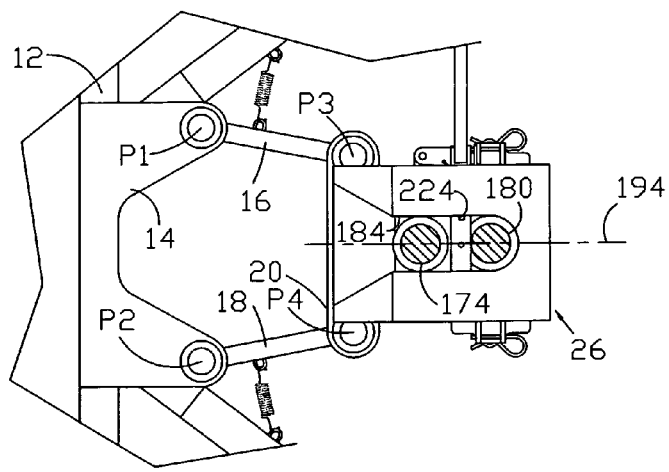
FIG. 2a is a top plan view of hitch box pin and pin adapter pin engaged with pin slot preventing any rotation at that point between trailer and fifth wheel.
Figure 8:
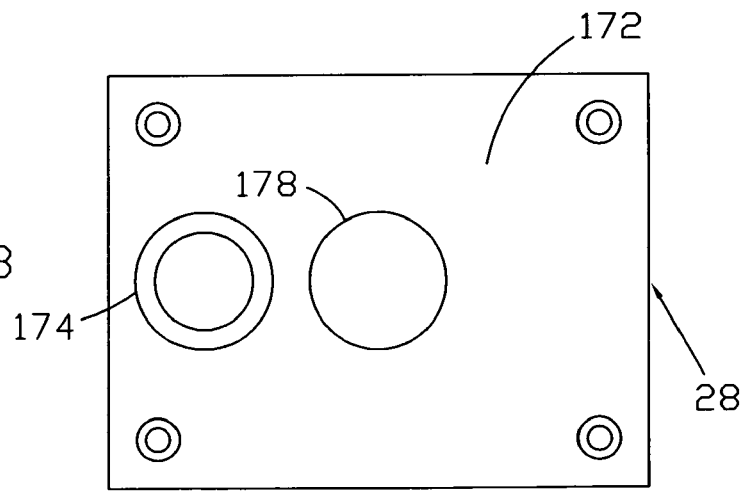
FIG. 8 is a bottom plan view of the fifth wheel pin adapter.
Figure 9:
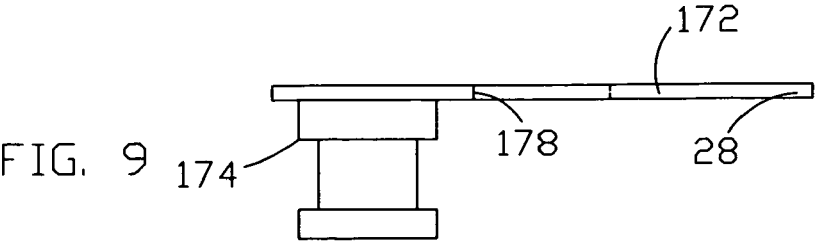
FIG. 9 is a side plan view of the fifth wheel pin adapter.

FIGS. 8 and 9 illustrate the structure of pin adapter 28, which consists of base plate 172, rearward pin adapter pin 174, and aperture 178 for receiving hitch box pin 180. FIG. 10 illustrates hitch box 182 and hitch box pin 180 fixedly attached to trailer 32 ready to receive pin adapter 28 that is positioned for attachment to plate 172. FIG. 11 illustrates hitch box pin 180 received through aperture 178 of plate 172 of pin adapter 28 and pin adapter 28 now rigidly fastened to the bottom surface of hitch box 182 with attachment means 170, which in this example are machine screws. As illustrated in FIGS. 2A, 11A, 14 and 16, when fastened, hitch box pin 180 and pin adapter pin 174 lie in a line coincident with longitudinal centerline 194 (see FIG. 2A) of trailer 32, and when the trailer is hitched to the truck, pins 174 and 180 engage with pin slot 184 (as illustrated in FIGS. 1, 2A, and 14) of fifth wheel assembly 26 and are held in position by latch bar 220 (see FIG. 14) preventing any rotation between trailer 32 and fifth wheel 26. The result is that all rotational pivoting between the truck and the trailer takes place within the four-link mechanism comprised of first and second elements 14 and 20 and two connecting links 16 and 18, as described above. As illustrated in FIGS. 1 and 3, the four-link mechanism is normally held in a centered position by two springs 252. This aids the hitching process as well as preventing the mechanism from moving about when the truck is driven without a trailer.

Figure 16:
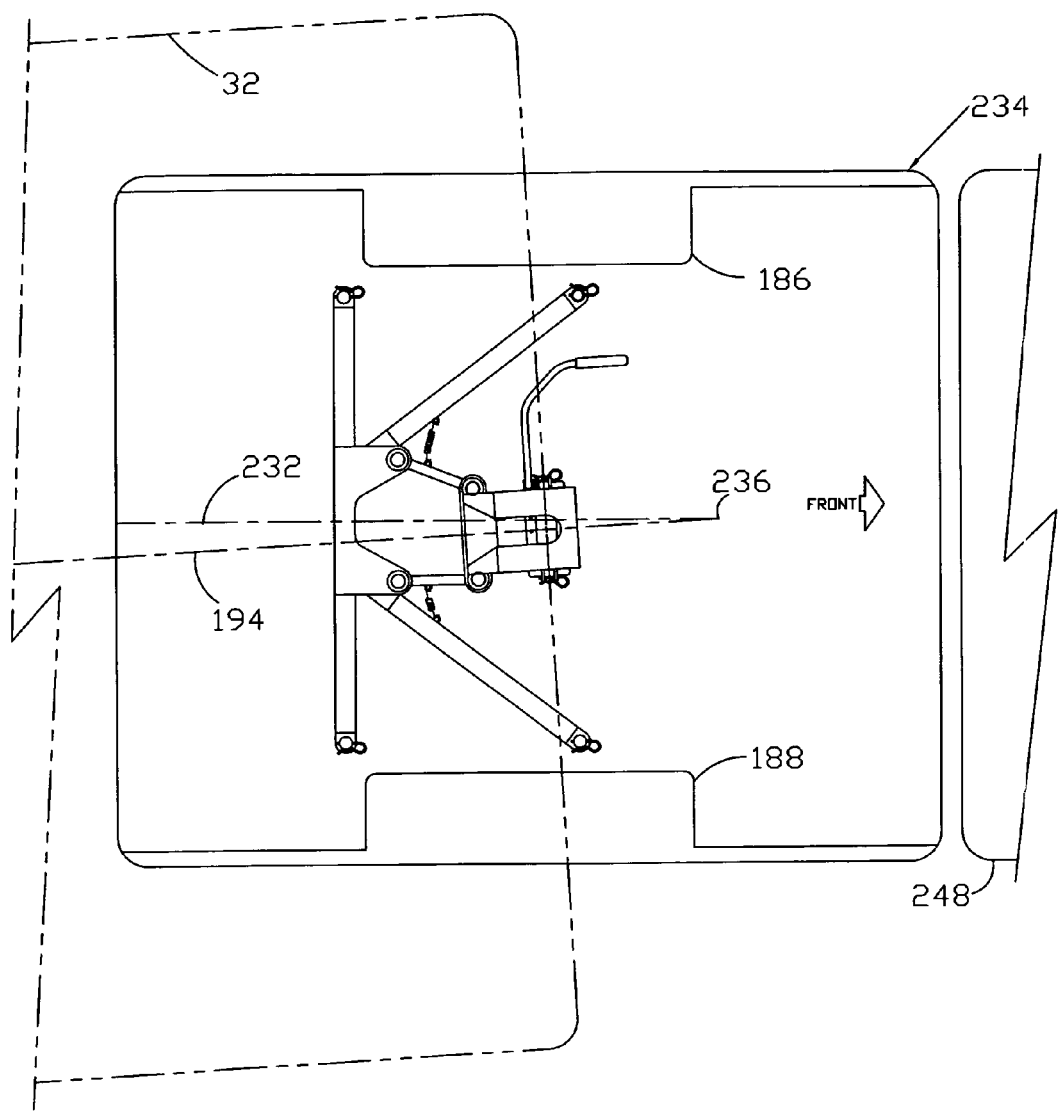
FIG. 16 is a top plan view of the fifth wheel hitch, shown in a slight turn of the truck and trailer (trailer shown in phantom).

FIG. 16 illustrates that when the trailer-truck is beginning a turn, the effective pivot point of the hitch is located at the intersection of centerline 194 of trailer 34 and centerline 232 of truck 234. The effective pivot point is indicated by point 236 on FIG. 16. As the turn sharpens (see FIGS. 17 and 18), the front end of the connecting link, 16 in this case, is on the outside of the turn, rotating past line 238 delineated by pivot bores 72 and 76 of first element 14. At the same time first element 14 allows clearance for second element 20 to pass through line 238. The total amount of rearward shifting of the pivot point of the trailer is dependant upon the size of the four link mechanism (14, 16, 18, and 20) and the longitudinal distance from second pivot member bearing bores 132 and 138 to the centerline of the forward pin of fifth wheel assembly 168.

Figure 13:
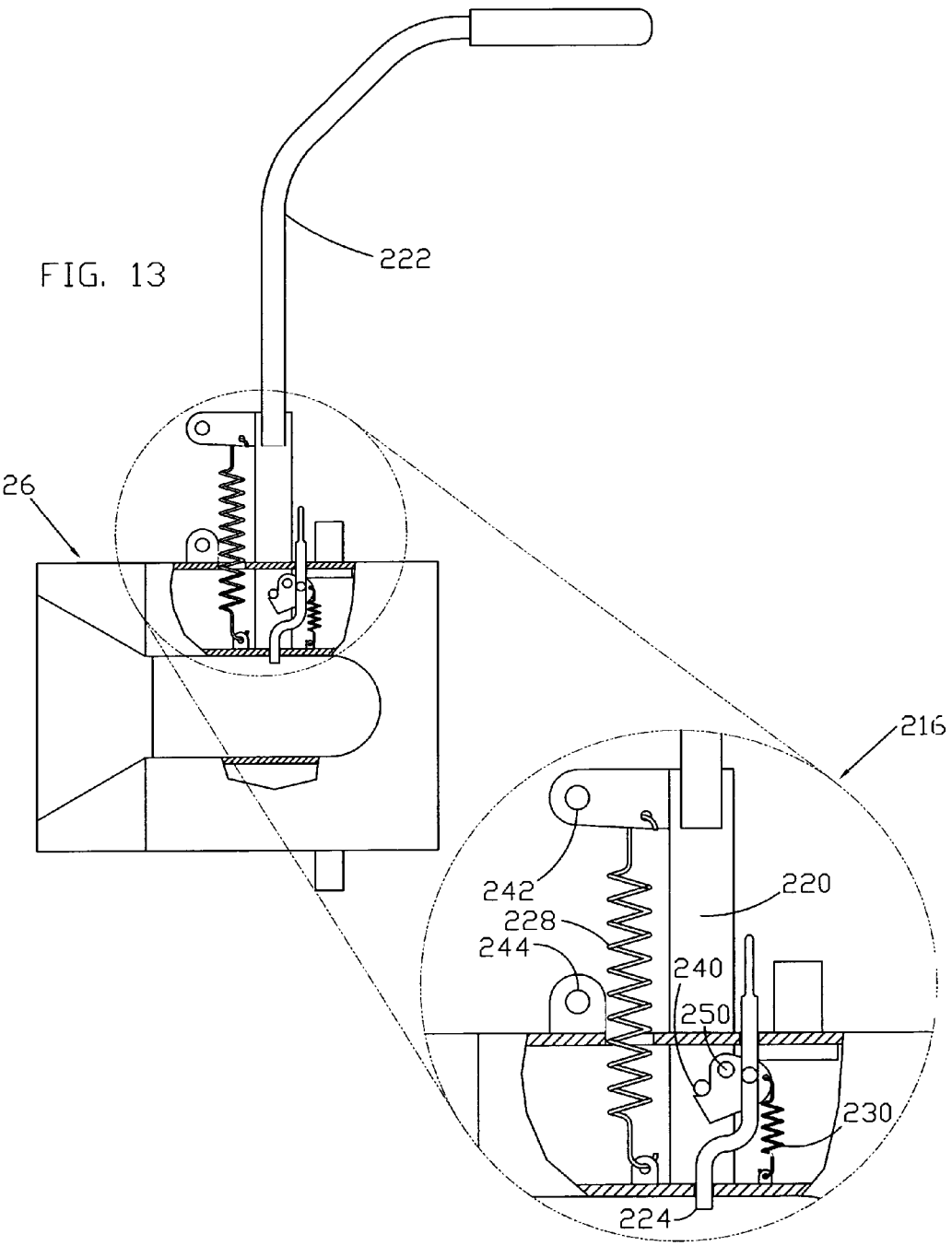
FIG. 13 is a top sectional view of the fifth wheel assembly, with the latch assembly open.

When hitching, the truck is backed into a position in line with the trailer and somewhat ahead of it. Fifth wheel lever 222 is then pulled laterally to an open position as shown in FIG. 13. Referring to FIGS. 12 and 13, as lever 222 is pulled laterally, it slides latch bar 220 with it, until retaining pin 240 passes by the hooked portion of retaining plate 226, which pivots on pin 250. At this point, retaining plate 226, held in position by spring 230, engages with retaining pin 240, thereby holding it in an open position as shown in FIG. 13. The truck is then backed under the pin of the trailer such that pin 180 slides into slot 184 of fifth wheel assembly 26. As illustrated in FIGS. 12, 13, and 14, when pin 180 strikes release trigger 224, retaining plate 226 rotates and latch bar 220 is released. As pin 180 reaches full engagement into fifth wheel assembly 26, latch bar 220 slides to a closed position behind it, moved by latch bar spring 228. The position of the latch plate can be locked in position, with a pin or a pad lock inserted into apertures 242 and 244.

When the trailer is to be unhitched, the fifth wheel lever is pulled laterally into an open position (see FIGS. 12 and 13). As the truck is pulled forward relative to the trailer, trigger 224 once again is struck by pin 180, releasing latch bar 220, which closes after pin 180 passes by it. If desired, latch plate 220, when in an open position, can be released by pulling laterally on finger aperture 246. A variety of readily available latching mechanisms that are well known in the art and those that are yet to be known may be substituted for the mechanism shown without deviating from the principles of the present invention.

Figure 19:
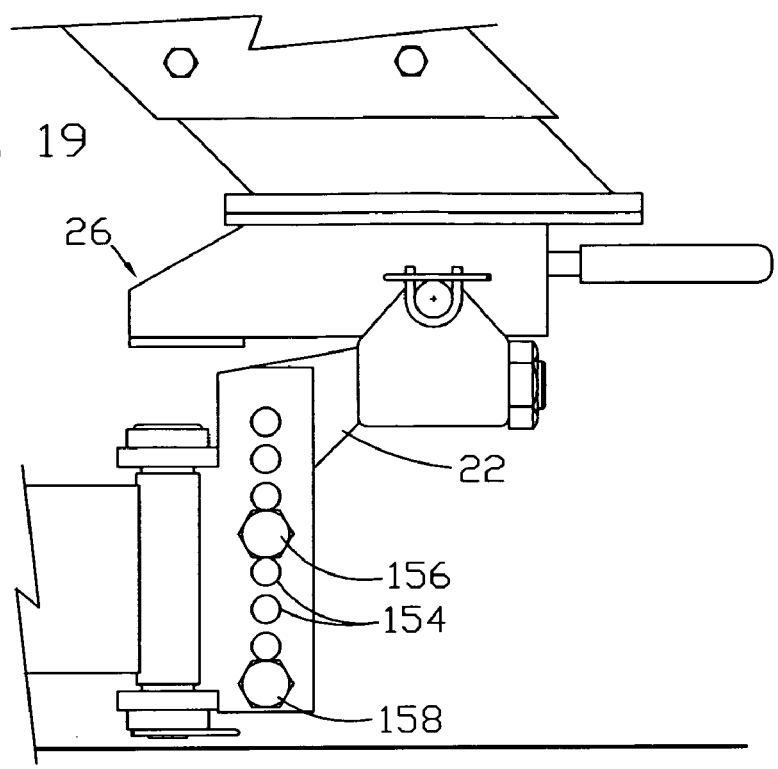
FIG. 19 is a side plan view of the height adjustment section of the second pivot member, shown in the lowest height position.
Figure 20:
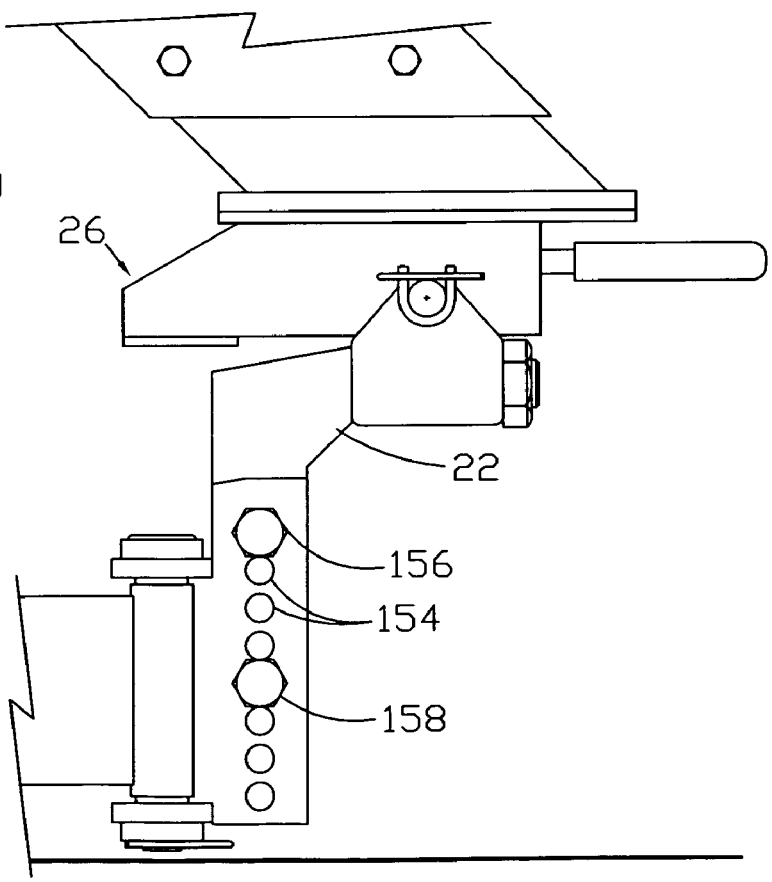
FIG. 20 is a side plan view of the height adjustment section of the second pivot member, shown in the highest height position.
Figure 21:
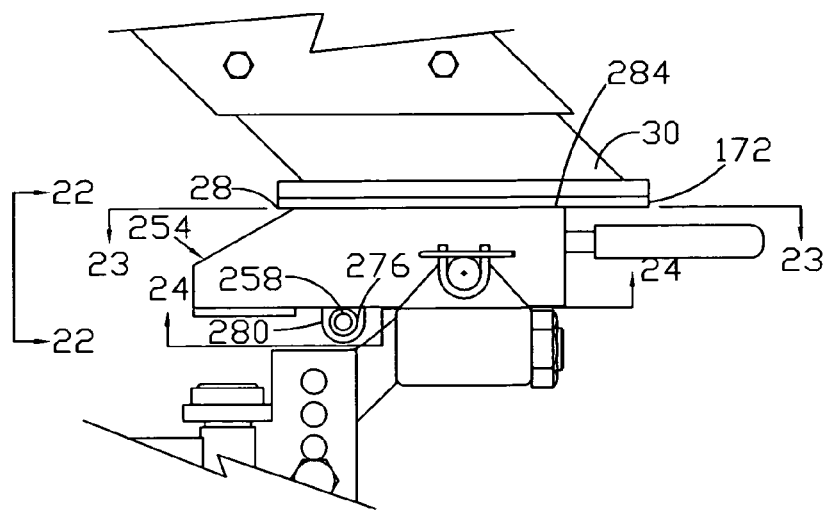
FIG. 21 is a side plan view of an alternate embodiment of the fifth wheel assembly and associated components.
Figure 22A:
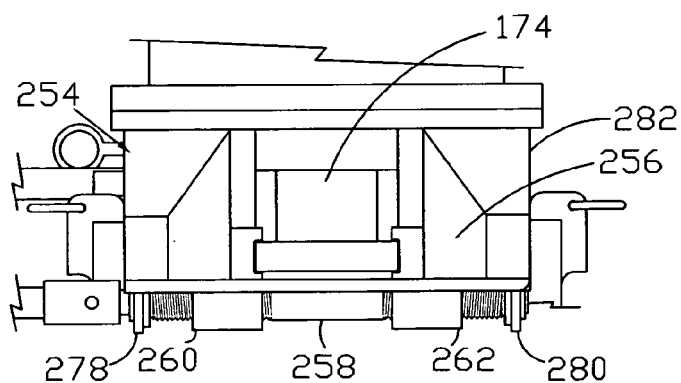
FIG. 22A is a rear plan view of an alternate embodiment of the fifth wheel assembly and associated components, with the clamping jaws shown in a closed position.
Figure 22B:
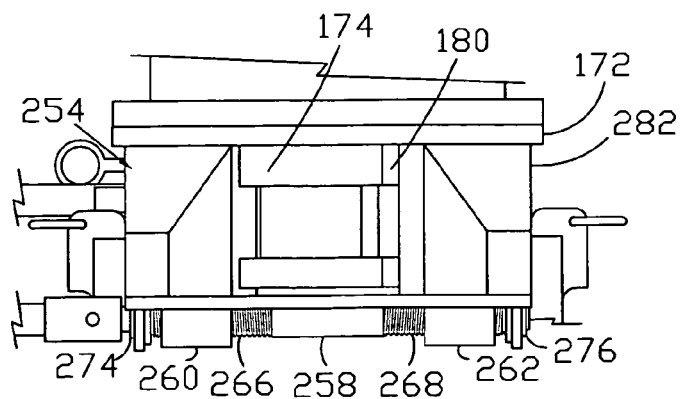
FIG. 22B is a rear plan view of an alternate embodiment of the fifth wheel assembly and associated components, with the clamping jaws shown in an open position.
Figures 23A, 23B:
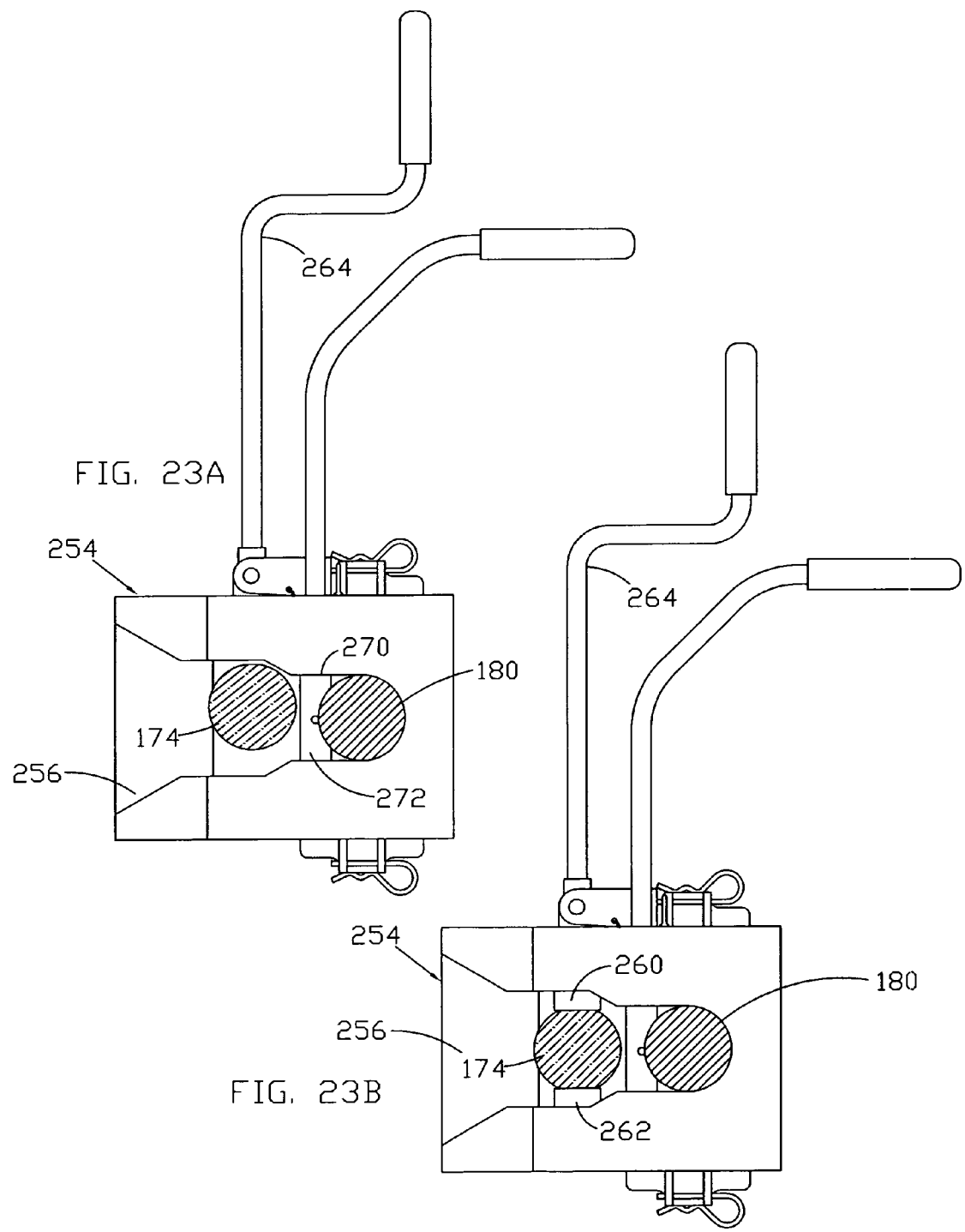
FIG. 23A is a top plan view of an alternate embodiment of the fifth wheel assembly, with the clamping jaws shown in an open position.
FIG. 23B is a top plan view of an alternate embodiment of the fifth wheel assembly, with the clamping jaws shown in a closed position.

As illustrated in FIGS. 19 and 20, the height of fifth wheel assembly 26 can be adjusted. This is accomplished by removing nuts 160 (FIG. 3) and bolts 156, 158, raising or lowering spindle 22, and re-inserting bolts 156, 158 and nuts 160 in different mounting apertures 154 thereby achieving the desired height.

Figure 24:
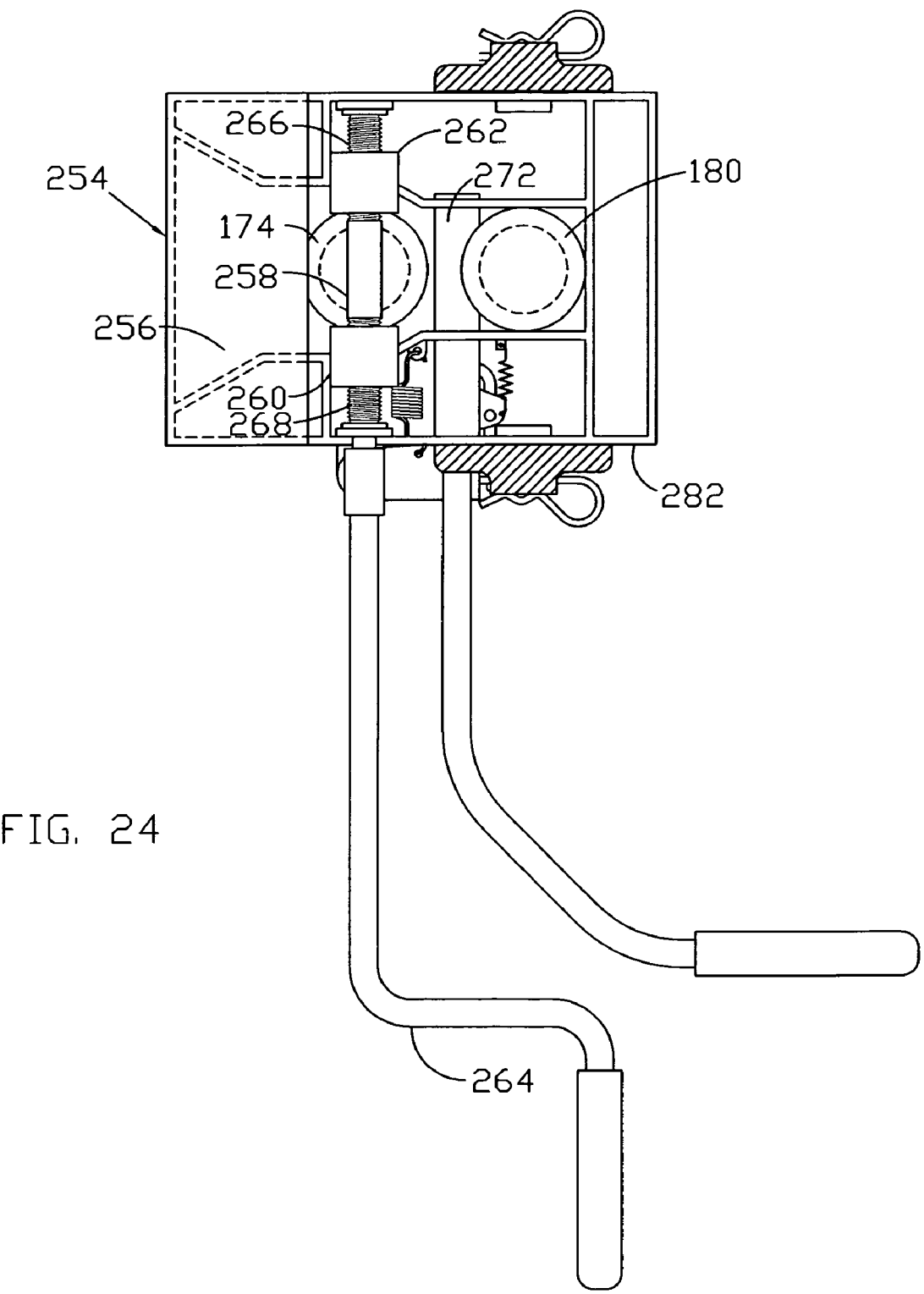
FIG. 24 is a bottom plan view of an alternate embodiment of the fifth wheel assembly, with the clamping jaws shown in a closed position.

FIGS. 21 through 24 show an alternate fifth wheel assembly 254. The purpose of this alternate is to allow for hitching when the centerline of the truck and the centerline of the trailer are at an angle to each other. Typically, when hitching, the front supporting jacks, or landing gear, on a fifth wheel trailer can allow for some front to back movement without damage. If the trailer is hitched at an angle, the landing gear is loaded from side to side and can be damaged. The present invention has two points of contact between the fifth wheel assembly and the pin adapter. If the truck and the trailer are not properly aligned, the engagement of hitch box pin 180 and pin adapter 28 to the fifth wheel assembly will tend to generate lateral forces on the front of the trailer. To avoid this problem alternate fifth wheel assembly 254 can be used. Referring back to the drawings, alternate fifth wheel assembly 254 is similar to the fifth wheel assembly 56, with the addition of widened pin slot 256, clamping screw 258, left and right clamp jaws 260 and 262, and crank 264 for rotating clamping screw 258. Clamping screw 258 is suspended on sleeve bearings 274 and 276 that are fitted into flanges 278 and 280, which are rigidly attached to base 282 of alternate fifth wheel assembly 254. Clamping screw 258 has right hand threads on one side 266 and left hand threads on other side 268, so as to move jaws 260 and 262 in opposite directions from each other and at the same rate. In the closed position (FIGS. 23B, 22A and 24) jaws 260 are centered with respect to fifth wheel slot 270. In use, crank 264 is rotated so as to move the jaws away form each other to an open position as shown in FIGS. 23A and 22B. With the jaws open, the trailer can then be hitched in a normal fashion, engaging hitch box pin 180 into slot 270 until latch bar 272 is closed behind it (FIG. 23A). The landing gear of the trailer can then be raised until it clears the road surface. After the landing gear is raised, crank 264 is rotated until jaws 260 and 262 are in a closed and centered position as illustrated in FIGS. 23B, 22A and 24. During this closing of the jaws portion of the hitching process, pin adapter plate 172 slides along top surface 284 of fifth wheel base 282 and any angular differences (FIG. 23A) between fifth wheel assembly 254 and hitch box pin 180 and pin adapter 28 are eliminated. The front end of the trailer may also move laterally as pin adapter 28 and fifth wheel assembly 254 align with each other. At this point the hitching process is complete. When unhitching, the clamping jaws can be left in a closed position as long as the truck is being driven straight forward relative to the trailer. If not, jaws 260 and 262 can be opened (FIGS. 22B and 23A) to allow for unhitching at an angle as allowed by the clearance of widened portion 256 of pin slot 270. It is also noted that clamping screw 258 could be driven by an electric motor, controlled by a switch, connected to the truck electrical system, thereby eliminating crank 264.

The foregoing description, for purposes of explanation, used specific and defined nomenclature to provide a thorough understanding of the invention. However, it will be apparent to one skilled in the art that the specific details presented are not required in order to practice the invention and are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. The invention is limited only by the claims.

What is claimed is:

1. A rotatable hitch assembly for detachably attaching a fifth wheel trailer to a towing vehicle, comprising a first hitch member, comprising: a) a base detachably attachable to the towing vehicle, said base having: i) a first element having a first pivotable end and a second pivotable end, ii) a second element having a first pivotable end and a second pivotable end, iii) a first linking member having a first pivotable end and a second pivotable end, said first linking member first pivotable end pivotably connected to said first pivotable end of said first element and said first linking member second pivotable end pivotably connected to said first pivotable end of said second element, and iv) a second linking member having a first pivotable end and a second pivotable end, said second linking member first pivotable end pivotably connected to said second pivotable end of said first element and said second linking member second pivotable end pivotably connected to said second pivotable end of said second element providing for four linked pivotable joints, said four linked pivotable joints providing for an effective pivot point between said trailer and said towing vehicle, such that increasing turning motion of said towing vehicle provides for pivotal motion of said four linked pivotable joints providing for automatic rearward repositioning of said effective pivot point, b) a fifth wheel assembly pivotally attached to said base, said fifth wheel assembly having a pin slot, said pin slot having a slot having an open end, a closed end, and parallel straight slot edges providing means for detachably attaching the trailer to the towing vehicle, c) a second hitch member attached to the trailer, comprising: a pin adapter fixedly attachable to a bottom surface of a hitch box attached to the trailer, said pin adapter providing for preventing rotational pivoting between a fifth wheel assembly and said hitch box when said first hitch member and said second hitch member are hitched to each other, providing for all rotational pivoting between said trailer and said towing vehicle to occur at said effective pivot point, d) said pin adaptor further comprising: a base plate having: i) an aperture for receiving a hitch box pin extending from said hitch box, and ii) a pin adapter pin extending from said base plate, wherein when said hitch box pin is received through said aperture of said base plate said pin adapter pin and said hitch box pin are proximate to each other with their center points positioned along an axis bisecting the length of said slot of said pin slot, said pin adapter pin and said hitch box pin thus positioned for acceptance by said slot of said fifth wheel assembly.

2. The rotatable hitch assembly for detachably attaching a fifth wheel trailer to a towing vehicle, as recited in claim 1 wherein when the towing vehicle-trailer is moved in a straight line, said effective pivot point is moved forward, thereby distributing lateral forces generated by the towed trailer between the front and rear wheels of the truck enhancing stability.

3. The rotatable hitch assembly for detachably attaching a fifth wheel trailer to a towing vehicle, as recited in claim 1, wherein said pin slot of said fifth wheel assembly having an open end, a closed end, and parallel straight and non-parallel angled stepped slot edges providing for said slot to be a widened slot toward said open end providing means for detachably attaching the trailer to the towing vehicle when the centerline of the truck and the centerline of the trailer are at an angle to each other.

4. The rotatable hitch assembly for detachably attaching a fifth wheel trailer to a towing vehicle, as recited in claim 3, wherein said fifth wheel assembly further comprises:
 a) clamping means, and
 b) a means to actuate said clamping means providing for any said center point of the pin adapter pin not positioned along the axis bisecting the length of said pin slot to be positioned along the axis bisecting the length of said pin slot.

5. The rotatable hitch assembly for detachably attaching a fifth wheel trailer to a towing vehicle, as recited in claim 4, further comprising an electric motor controlled by a switch connected to the truck electrical system providing for actuating means to be driven by said electric motor.

* * * * *